(12) United States Patent
Lunaparra et al.

(10) Patent No.: US 11,507,735 B2
(45) Date of Patent: Nov. 22, 2022

(54) MODIFYING A DOCUMENT CONTENT SECTION OF A DOCUMENT OBJECT OF A GRAPHICAL USER INTERFACE (GUI)

(71) Applicant: Capital One Services, LLC, McLean, VA (US)

(72) Inventors: Miguel Lunaparra, Burlingame, CA (US); Melissa Madrid, Oakland, CA (US); Samantha Anna King, Oakland, CA (US); Subha Duraisamy, Pittsburg, CA (US); Tsun Wai Tang, San Francisco, CA (US); Laya Esmaeili Zare, San Francisco, CA (US); Shoshana Holtzblatt, Silver Spring, MD (US); Victor Corral, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 54 days.

(21) Appl. No.: 17/248,524

(22) Filed: Jan. 28, 2021

(65) Prior Publication Data

US 2022/0164524 A1     May 26, 2022

Related U.S. Application Data

(60) Provisional application No. 63/117,311, filed on Nov. 23, 2020.

(51) Int. Cl.
*G06F 40/166* (2020.01)
*G06F 3/0484* (2022.01)

(52) U.S. Cl.
CPC .......... *G06F 40/166* (2020.01); *G06F 3/0484* (2013.01)

(58) Field of Classification Search
CPC ............................. G06F 40/166; G06F 3/0484
See application file for complete search history.

(56) References Cited

U.S. PATENT DOCUMENTS

| | | | |
|---|---|---|---|
| 9,727,885 B1* | 8/2017 | Reier | G16H 70/20 |
| 2005/0097033 A1* | 5/2005 | Pretell | G06Q 40/025 |
| | | | 705/38 |
| 2006/0059225 A1* | 3/2006 | Stonehocker | G06F 16/9562 |
| | | | 709/202 |
| 2014/0180979 A1* | 6/2014 | Pinckney | G06F 16/9535 |
| | | | 706/12 |

(Continued)

*Primary Examiner* — Daniel W Parcher
(74) *Attorney, Agent, or Firm* — Harrity & Harrity, LLP

(57) ABSTRACT

In some implementations, a client device may provide, in a document object of a user interface, a primary document content section, and a secondary document content section that includes first document content. The client device may receive, via a first input and a second input, user input of a particular combination of an objective and an outcome for the objective. The client device may obtain presentation information that identifies a plurality of informational content blocks responsive to the particular combination. The client device may insert code based on the presentation information into the document object, where the code causes the secondary document content section to change content from the first document content to second document content. The client device may provide the user interface for presentation by the client device based on inserting the code into the document object.

20 Claims, 10 Drawing Sheets

(56) References Cited

U.S. PATENT DOCUMENTS

| | | | |
|---|---|---|---|
| 2015/0081691 A1* | 3/2015 | Cramer | G06F 16/337 |
| | | | 707/728 |
| 2015/0088970 A1* | 3/2015 | Wei | H04L 67/02 |
| | | | 709/203 |
| 2016/0247233 A1* | 8/2016 | Page | G06Q 20/405 |
| 2017/0061548 A1* | 3/2017 | Roebuck | G06Q 40/123 |
| 2019/0130487 A1* | 5/2019 | De Beer | G06F 16/9574 |
| 2020/0278840 A1* | 9/2020 | Wise | G06Q 40/06 |
| 2020/0320894 A1* | 10/2020 | Davidson | G09B 19/00 |
| 2020/0366654 A1* | 11/2020 | De Beer | G06Q 40/04 |

* cited by examiner

500

510 — Provide, in a document object of a user interface, a primary document content section, and a secondary document content section that includes first document content, for presentation, where the first document content includes at least a first input for selection of an objective from a plurality of objectives and a second input for selection of an outcome for the objective from a plurality of outcomes 520 — Receive, via the first input and the second input, user input of a particular combination of the objective and the outcome 530 — Obtain presentation information that identifies a plurality of informational content blocks responsive to the particular combination, where an informational content block, of the plurality of informational content blocks, includes a direct pointer to a resource, and the primary document content section includes a direct or indirect pointer to the resource 540 — Insert code based on the presentation information into the document object, where the code causes the secondary document content section to change content from the first document content to second document content for presentation via the user interface, where the second document content includes the plurality of informational content blocks 550 — Provide the user interface for presentation based on inserting the code into the document object

FIG. 5

MODIFYING A DOCUMENT CONTENT SECTION OF A DOCUMENT OBJECT OF A GRAPHICAL USER INTERFACE (GUI)

CROSS-REFERENCE TO RELATED APPLICATION

This Patent Applications claims priority to U.S. Provisional Patent Application No. 63/117,311, filed on Nov. 23, 2020, and entitled "MODIFYING A DOCUMENT CONTENT SECTION OF A DOCUMENT OBJECT OF A GRAPHICAL USER INTERFACE (GUI)." The disclosure of the prior Applications is considered part of and is incorporated by reference into this Patent Applications.

BACKGROUND

A graphical user interface is a form of user interface that allows users to interact with electronic devices. A web browser may provide a graphical user interface that presents web pages. A user may navigate to a web page by entering a web address into an address bar of the web browser and/or by clicking a link displayed via another web page. Navigation to a web page may consume resources of a client device on which the web browser is installed, may consume resources of a web server that serves the web page to the client device, and may consume network resources used for communications between the client device and the web server.

SUMMARY

In some implementations, a non-transitory computer-readable medium storing a set of instructions for modifying a document object of a user interface to be provided for presentation by a client device includes one or more instructions that, when executed by one or more processors of the client device, cause the client device to: provide, in the document object of the user interface, a primary document content section, and a secondary document content section that includes first document content, for presentation by the client device, where the first document content includes at least a first input for selection of an objective from a plurality of objectives and a second input for selection of an outcome for the objective from a plurality of outcomes; receive, via the first input and the second input, user input of a particular combination of the objective and the outcome; obtain presentation information that identifies a plurality of informational content blocks responsive to the particular combination, where an informational content block, of the plurality of informational content blocks, includes a direct pointer to a resource, and the primary document content section includes a direct or indirect pointer to the resource; insert code based on the presentation information into the document object, where the code causes the secondary document content section to change content from the first document content to second document content for presentation via the user interface by the client device, where the second document content includes the plurality of informational content blocks; and provide the user interface for presentation by the client device based on inserting the code into the document object.

In some implementations, a method of modifying a document object of a user interface to be provided for presentation by a client device includes providing, in the document object of the user interface, a primary document content section, and a secondary document content section that includes first document content, for presentation by the client device, where the first document content includes at least a first input for selection of an objective from a plurality of objectives and a second input for selection of an outcome for the objective from a plurality of outcomes; receiving, via the first input and the second input, user input of a particular combination of the objective and the outcome; obtaining presentation information that identifies informational content responsive to the particular combination; inserting code based on the presentation information into the document object, where the code causes the secondary document content section to change content from the first document content to second document content for presentation via the user interface by the client device, where the second document content includes the informational content; and providing the user interface for presentation by the client device based on inserting the code into the document object.

In some implementations, a system for modifying a document object of a user interface to be provided for presentation by a client device includes one or more memories and one or more processors, communicatively coupled to the one or more memories, configured to: transmit, to the client device, first presentation information that identifies a primary document content section, and a secondary document content section that includes first document content, for the document object of the user interface to be provided for presentation by the client device, where the first document content includes at least a first input for selection of an objective from a plurality of objectives and a second input for selection of an outcome for the objective from a plurality of outcomes; receive, from the client device, user interface information that identifies a particular combination of the objective and the outcome based on user input provided to the client device; determine a plurality of informational content blocks that are responsive to the particular combination, where an informational content block, of the plurality of informational content blocks, includes a direct pointer to a resource, and the primary document content section includes a direct or indirect pointer to the resource; and transmit, to the client device, second presentation information that identifies the plurality of informational content blocks to cause the secondary document content section to change content from the first document content to second document content for presentation via the user interface by the client device, where the second document content includes the plurality of informational content blocks.

BRIEF DESCRIPTION OF THE DRAWINGS

FIGS. 5 and 6 are flowcharts of example processes relating to modifying a document object of a user interface to be provided for presentation.

DETAILED DESCRIPTION

Figure 1A:
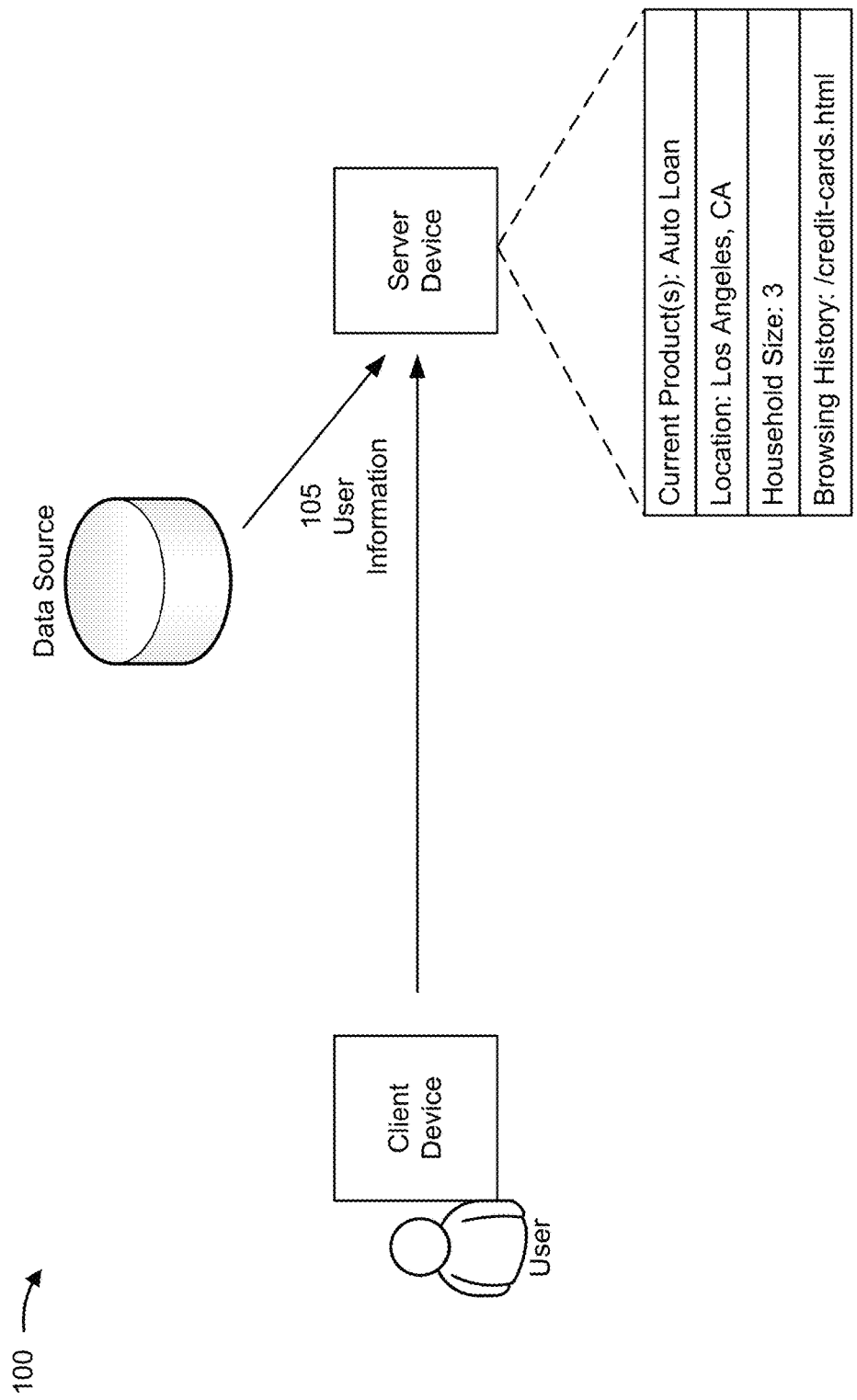
FIGS. 1A-1E are diagrams of an example implementation relating to modifying a document content section of a document object of a graphical user interface (GUI).

The following detailed description of example implementations refers to the accompanying drawings. The same reference numbers in different drawings may identify the same or similar elements.

A user interface of a client device, such as a user interface provided by a web browser, may include a webpage for presentation via the client device. The webpage may include hyperlinks to various other webpages. For example, a homepage, or a main page, may include links to multiple sub-pages. Often, it may be difficult for a user to locate, via the homepage, particular information of interest that is included in a sub-page. For example, the hyperlink descriptions on the homepage may be unintuitive and/or the user may need to click through hyperlinks in multiple hierarchical levels of sub-pages in order to locate the information of interest. Navigating through a large number of webpages to find relevant information creates a poor user experience, consumes excessive computing resources (e.g., processing resources and memory resources) that are needed for the client device to generate and display the webpages and that are needed for one or more server devices to serve the webpages to the client device, and consumes excessive network resources that are needed for communications between the client device and the server device.

In some cases, the homepage may provide a search interface for locating information included in sub-pages. However, the search interface may operate based on keyword searching, which may be unhelpful if the user is not aware of particular keywords relevant to the information of interest. As a result, the user may need to perform multiple searches using various combinations of keywords, which may also create a poor user experience, consume excessive computing resources needed for executing the multiple searches and displaying the search results, and consume excessive network resources. Moreover, search results are typically presented to the user on a separate webpage from the homepage, which may confuse the user, result in the user missing important information included on the homepage, and/or consume computing resources or network resources associated with loading the separate webpage.

Some implementations described herein provide techniques and systems to modify a user interface for presentation by a client device. The user interface may include a document object (e.g., a webpage, such as a homepage) that includes a primary document content section (e.g., a main content section) and a secondary document content section (e.g., a guidance content section that is displayed between portions of the main content section). The secondary document content section may include one or more inputs for the user to select parameters for locating informational content of interest. In some implementations, the parameters may include an objective of the user (e.g., a financial objective, such as growing the user's money or preventing fraud) and the user's desired outcome for the objective (e.g., an emotional outcome, such as sleeping better at night or feeling secure). In this way, the user may locate informational content of interest in an intuitive manner, thereby improving the user experience and conserving computing and/or networking resources that may otherwise be used for multiple keyword-based search requests.

In addition, the client device may obtain (e.g., via a server device) informational content blocks responsive to the parameters selected by the user (e.g., a particular combination of an objective and an outcome). The informational content blocks may be presented in the secondary document content section, for example, without a change to the content of the primary document content section. Moreover, the informational content blocks may include pointers (e.g., hyperlinks) to resources (e.g., sub-pages associated with the homepage) that are also accessible via pointers included in the primary document content section. In other words, the user may quickly locate informational content of interest without navigating away from the homepage and without following numerous links from the homepage. In this way, computing resources and/or network resources may be conserved by reducing an amount of navigation performed by the user. Furthermore, the systems described herein make data easier to access by enhancing a user interface, thereby improving a user experience, enhancing user-friendliness of a client device and the user interface, and improving the ability of a user to use the client device.

FIGS. 1A-1E are diagrams of an example implementation 100 associated with modifying a document content section of a document object of a GUI. As shown in FIG. 1, example implementation 100 includes a client device, a server device, and a data source (e.g., a data structure, such as a database). These devices are described in more detail below in connection with FIG. 3 and FIG. 4.

As shown in FIG. 1A and by reference number 105, the server device may obtain user information relating to a user of the client device. For example, the client device may request a resource (e.g., a webpage) from the server device, and the server device may obtain the user information in connection with providing the resource to the client device. The resource may be associated with an entity (e.g., a financial institution). For example, the resource may be a webpage of a website associated with the entity. The user information may include location information associated with the client device (e.g., a city associated with the client device or geographic coordinates of the client device), browsing history information associated with the client device (e.g., based on previous requests for resources made by the client device), demographic information associated with the user (e.g., a household size of the user, an education level of the user, among other examples), and/or account information associated with the user (e.g., one or more products and/or services of the entity associated with the user account), among other examples.

In some implementations, the server device may obtain the user information from the client device. For example, the server device may read one or more cookies stored on the client device or may receive information from the client device. Additionally, or alternatively, the server device may obtain the user information from the data source. For example, the user may access an account held with the entity via the server device, and the server device may obtain the user information associated with the account from the data source.

Figure 1B:
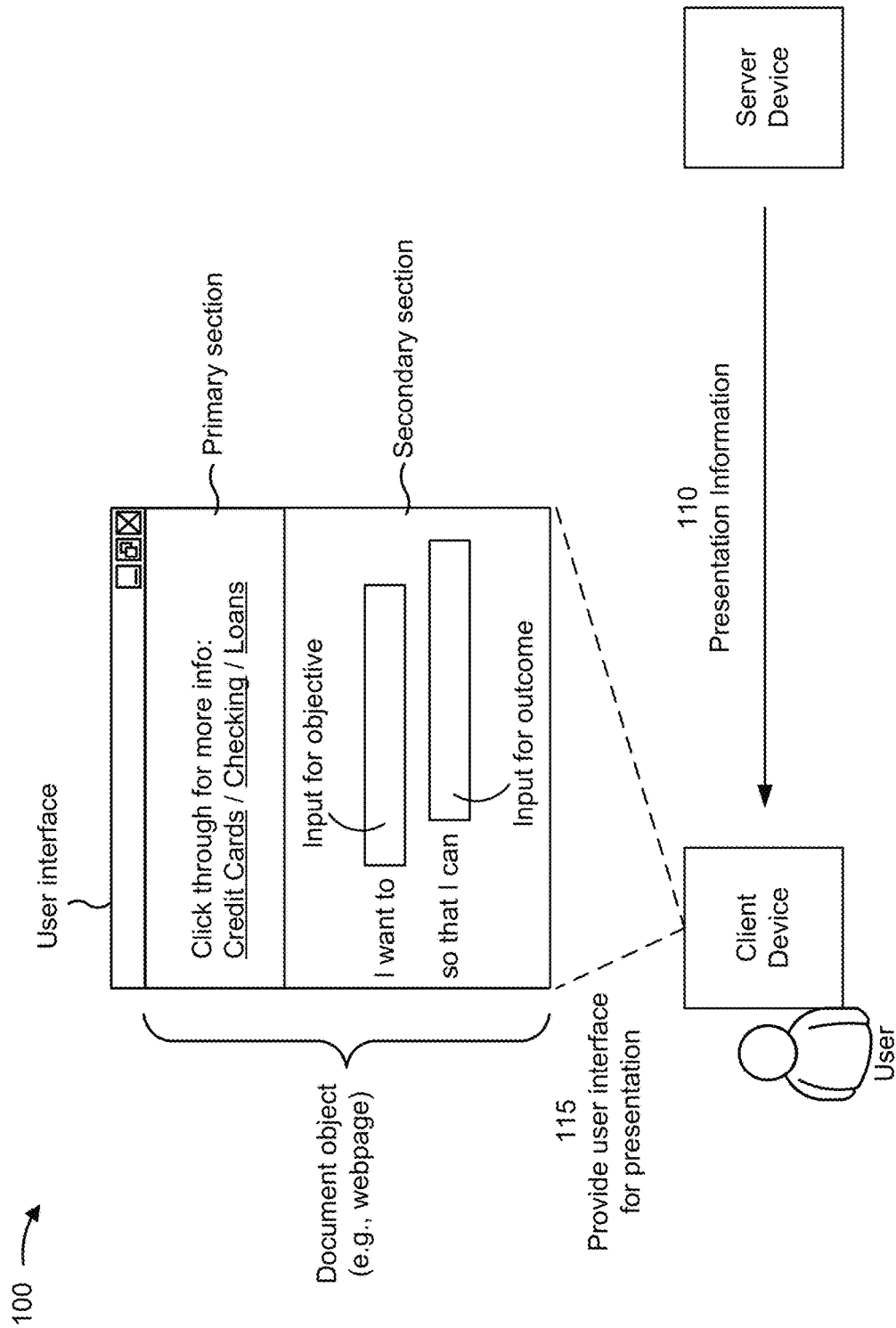

As shown in FIG. 1B and by reference number 110, the server device may transmit first presentation information to the client device. For example, the server device may transmit the presentation information in response to the client device requesting a resource (e.g., a webpage) from the server device, as described above. The presentation information may identify content for a user interface that is to be provided for presentation by the client device. For example, the presentation information may identify content for a document object (e.g., a webpage requested by the client device) of the user interface. The document object may be associated with a document object model (DOM) that includes code for generating the document object (e.g., the webpage).

As shown by reference number 115, the client device may provide the user interface for presentation by the client device based on receiving the presentation information. For example, the client device may provide the content of the document object identified by the presentation information in the user interface. In some implementations, the user interface may be provided in a web browser of the client device. Although some techniques are described herein in connection with webpages, one or more techniques described herein may be used in connection with other types of user interfaces, such as a user interface associated with an application other than a web browser.

The document object may include a primary document content section (shown as "primary section") and a secondary document content section (shown as "secondary section"). In some implementations, the secondary section may be between (e.g., sandwiched between) portions of the primary section. In some implementations, the secondary section may be embedded within the primary section.

The primary section may include content that includes pointers (e.g., hyperlinks) to one or more resources (e.g., webpages). For example, the document object may be associated with a homepage of a website (e.g., a top-level webpage in a hierarchical representation of the website), and the one or more resources may be webpages of the website (e.g., second-level webpages, third-level webpages, etc., in the hierarchical representation of the website). As shown, the primary section may include pointers to a "Credit Cards" resource, a "Checking" resource, and a "Loans" resource.

The secondary section may include initial content (e.g., first document content), such as when the document object is first loaded (or refreshed) in the user interface for presentation by the client device. The initial content may include at least a first input for inputting an objective and a second input for inputting an outcome for the objective (e.g., the initial content may include at least one input for inputting a goal). In some implementations, the first input may be configured for selection of the objective from a plurality of objectives, and the second input may be configured for selection of the outcome from a plurality of outcomes. As shown, the first input and the second input may be presented within a grammatical sentence, such that the sentence is completed when the first input and the second input are filled.

The objective may be a quantitative objective (e.g., the objective may be measured in terms of a quantity of a particular target). For example, the objective may be a financial objective of the user (e.g., growing money, improving credit, or preventing fraud). The outcome may be the user's desired result when the objective is accomplished. The outcome may be a qualitative outcome (e.g., the outcome may be measured in terms of a quality of a particular target). For example, the outcome may be an emotional outcome for the objective (e.g., sleeping better at night, feeling more secure, or protecting the user's future). In some implementations, the initial content may include more or less than two inputs and/or the input(s) may be for inputting data other than an objective and an outcome.

In some implementations, the server device may determine a first default selection that is to be assigned to the first input and a second default selection that is to be assigned to the second input. For example, the server device may determine the default selections based on the user information (e.g., demographic information, account information, location information, and/or browsing history information, among other examples) obtained by the server device. In some examples, the server device may use a machine learning model to determine the default selections. For example, the machine learning model may be trained to identify default selections based on demographic information, account information, location information, and/or browsing history information. As an example, if the user has a household size of three and currently has an auto loan, the machine learning model may identify default selections based on selections made by other users with household sizes of three and auto loans.

The first presentation information (e.g., the initial content for the primary section) may identify the first default selection and the second default selection determined for the user. In addition, the client device may present the first and second default selections, in the first and second inputs, in the user interface. That is, the first and second inputs may be pre-populated with the default selections.

Figure 1C:
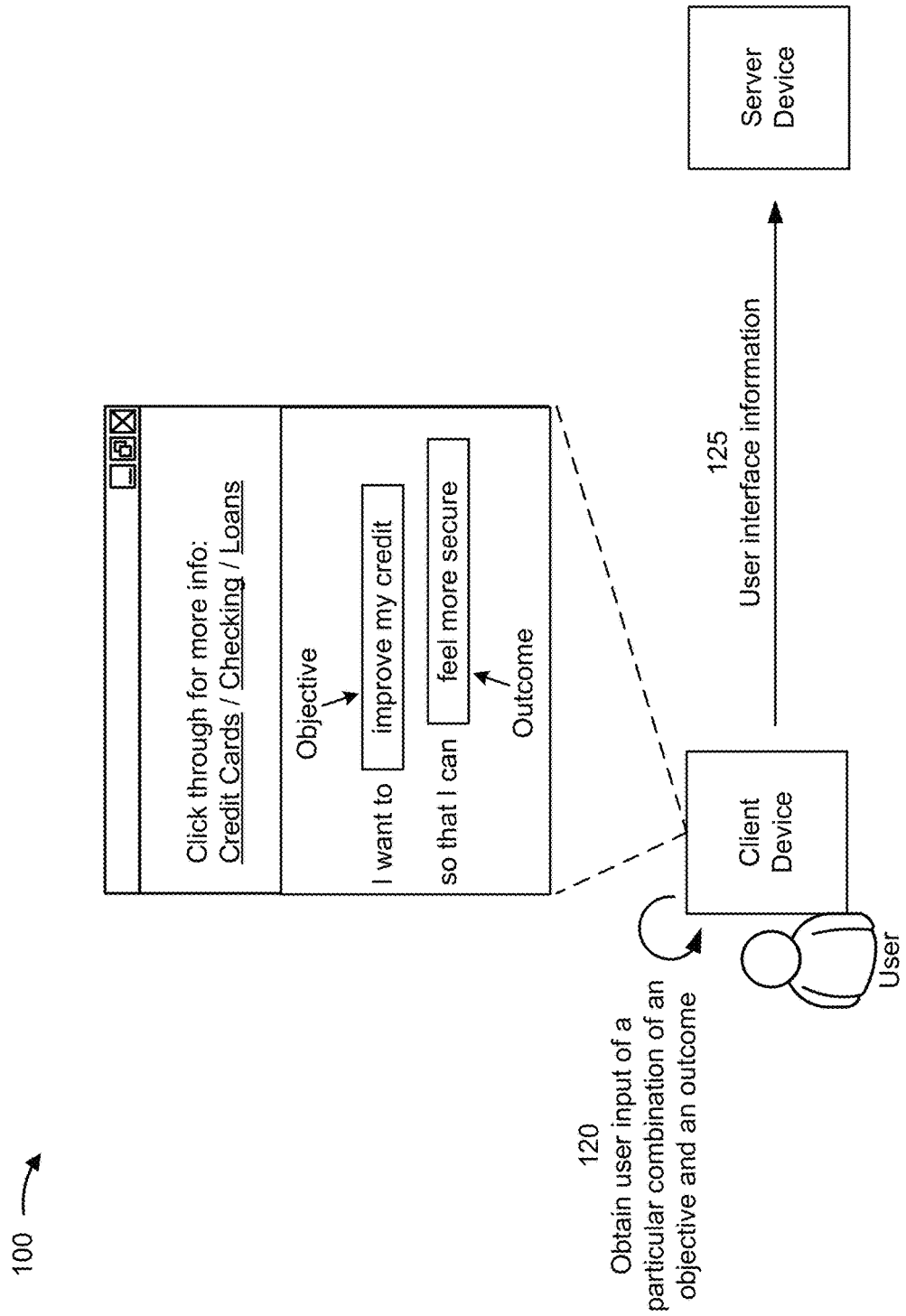

As shown in FIG. 1C and by reference number 120, the client device may obtain a user input of a particular combination of the objective and the outcome. That is, the client device may receive, via the first and second inputs, the user input of the particular combination of the objective and the outcome. For example, the user may input the particular combination of the objective and the outcome to the first and second inputs via the user interface. The particular combination of the objective and the outcome may be unique to the user or may be one of a plurality of possible combinations (e.g., if the objective is selected from the plurality of objectives and the outcome is selected from the plurality of outcomes). As shown, the particular combination input by the user may be "improve my credit" and "feel more secure." Thus, the user may locate information based on the combination of the objective and the outcome, rather than by keyword searching. In this way, techniques described herein improve user experience and conserve computing resources that may otherwise be used for multiple undirected keyword searches.

As shown by reference number 125, the client device may transmit user interface information to the server device. The user interface information may identify the particular combination of the objective and the outcome of the user input provided to the client device.

Figure 1D:
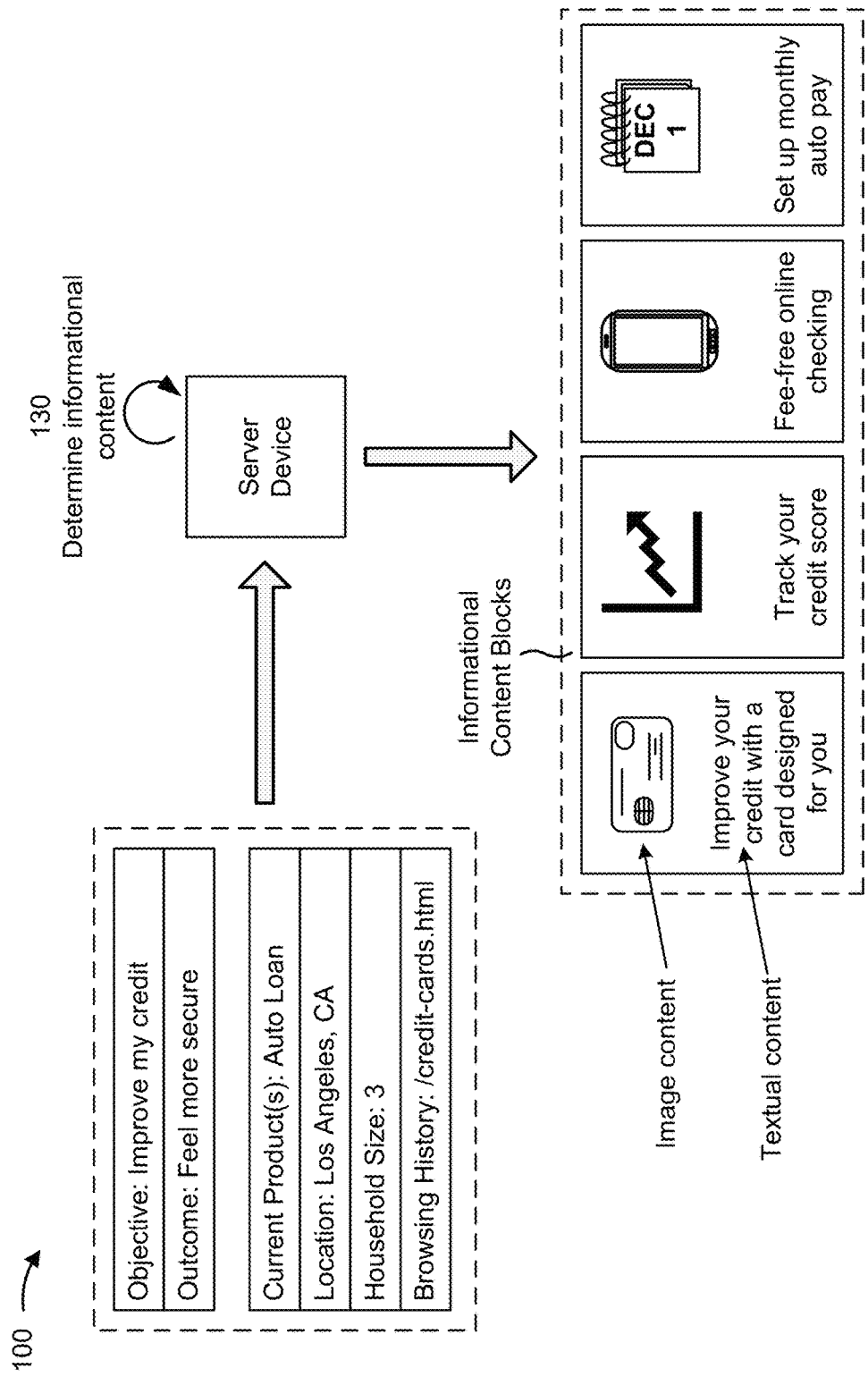

As shown in FIG. 1D and by reference number 130, the server device may determine informational content responsive to the particular combination of the objective and the outcome of the user interface information. The informational content may include textual content and/or image content. The informational content may include a pointer (e.g., a hyperlink, which may be associated with the textual content and/or the image content) to a resource (e.g., a webpage). For example, the informational content may include a direct pointer to the resource (e.g., the pointer does not lead to an intermediate resource that includes a direct pointer to the resource). The resource (e.g., a webpage) may include information on a particular product, information on a particular service, inputs for registering for the particular product, inputs for registering for the particular service, an interactive tool (e.g., a calculator), and/or an article (e.g., providing advice on a particular topic or other educational information), among other examples.

In some implementations, the informational content may include a plurality of informational content blocks. Here, each informational content block may include respective textual content and/or image content. In addition, each informational content block may include a direct pointer to a respective resource. In some implementations, the plurality of informational content blocks may include at least a first informational content block that includes information relating to advice (e.g., information that provides advice to the user, such as financial advice or educational information) and/or a pointer thereto, a second informational content block that includes information relating to a service offered by the entity (e.g., a credit tracking service, an identity theft protection service, or a fraud prevention service, among other examples) and/or a pointer thereto, a third informational content block that includes information relating to a tool usable via the user interface (e.g., a calculator tool, such as a loan repayment calculator, or a product comparison tool) and/or a pointer thereto, and/or a fourth informational content block that includes information relating to a product offered by the entity (e.g., a checking account, an individual retirement account, or a credit card, among other examples) and/or a pointer thereto.

The server device may determine the informational content (e.g., the plurality of informational content blocks) based on the particular combination (e.g., at least one of the objective or the outcome of the particular combination) identified by the user interface information. As an example, the server device may determine first informational content (e.g., a first plurality of informational content blocks) for a first combination, determine second informational content (e.g., a second plurality of informational content blocks) for a second combination, and so forth.

Additionally, the server device may determine the informational content (e.g., the plurality of informational content blocks) based on the user information obtained by the server device. For example, the server device may determine the informational content (e.g., the plurality of informational content blocks) based on demographic information associated with the user (e.g., indicating a household size of the user), account information associated with the user (e.g., indicating one or more products of the entity already associated with the user), a location of the client device or the user, and/or a browsing history of the client device (e.g., in connection with the website of the entity), among other examples. As an example, if the demographic information indicates that the household size of the user is greater than two, the server device may determine informational content (e.g., a plurality of informational content blocks) that is associated with families.

In some implementations, the server device may use a machine learning model, as described below in connection with FIG. 2, to determine the informational content (e.g., the plurality of informational content blocks). For example, the machine learning model may be trained to identify informational content based on demographic information, account information, location information, browsing history information, and/or interactivity information (e.g., whether users followed a particular pointer, used a particular tool, and/or registered for a particular product or service). As an example, if the user is located in Los Angeles and currently has an auto loan, the machine learning model may identify informational content (e.g., a plurality of informational content blocks) with which other users in Los Angeles having auto loans interacted (e.g., by clicking on a pointer of the informational content, by registering for a product or service associated with the informational content, and/or by using a tool associated with the informational content). In some implementations, the server device may determine the informational content (e.g., determine one or more informational content blocks that are to be included in the plurality of informational content blocks) based on a determination that the informational content is associated with a threshold level of interactivity (e.g., a quantity of clicks or a quantity of registrations) among users that selected the same particular combination as the user.

In some implementations, the server device may determine the informational content (e.g., the plurality of informational content blocks) based on the browsing history of the client device (e.g., in connection with the website of the entity). For example, the server device may determine that a particular resource was previously accessed by the client device. Continuing with the example, the server device may determine whether particular informational content (e.g., a particular informational content block), that includes a pointer to the resource, is to be presented to the user based on determining that the resource was previously accessed by the client device. As an example, the server device may determine that the informational content is not to be presented to the user (e.g., so that redundant information is not presented to the user). As another example, the server device may determine that the informational content is to be presented to the user (e.g., so that information previously of interest to the user is presented again).

In some implementations, the server device may determine, for the plurality of informational content blocks, an order of relevance to the particular combination of the objective and the outcome. For example, the server device may use a machine learning model or another algorithm to determine a relevance score for informational content (e.g., an informational content block). In some examples, when determining the order of relevance, the server device may prioritize one or more types of informational content (e.g., informational content blocks). For example, informational content that includes information relating to a product or a service may be prioritized first, informational content that includes information relating to a tool may be prioritized second, and informational content that includes information relating to advice may be prioritized third.

The server device also may determine the textual content and/or the image content for the informational content (e.g., for an informational content block). For example, after determining for the user a particular informational content block that includes a pointer to a particular resource, the server device may determine textual content and/or image content for the informational content block that is customized for the user. Accordingly, informational content (e.g., an informational content block) that points to a particular resource may include first textual content and/or image content for a first user and may include second textual content and/or image content for a second user.

In some implementations, the server device may determine textual content and/or image content (e.g., for an informational content block) based on the user information obtained by the server device. For example, the server device may determine textual content and/or image content based on demographic information, account information, location information, and/or browsing history information, as described above. As an example, if the location information indicates that the user is in Los Angeles, the server device may determine textual content and/or image content that references/depicts California. In some implementations, the server device may use a machine learning model to determine textual content and/or image content, in a similar manner as described above. For example, the machine learning model may be trained to identify textual content and/or image content based on demographic information, account information, location information, browsing history information, and/or interactivity information, as described above. As an example, if the user currently has an auto loan and previously browsed a webpage relating to credit cards, the machine learning model may identify textual content and/or image content that was used for other users, with an auto loan and a similar browsing history, that interacted with informational content.

In some implementations, the server device may employ a multi-armed bandit procedure to determine the informational content and/or the textual/image content of the informational content. Here, different compositions of informational content and/or textual/image content may be presented to different sets of users, and an amount of interactivity with the different compositions may be tracked. Furthermore, proportions of users that are presented with the different composition may be adjusted in real-time based on respective levels of interactivity associated with the different compositions (e.g., a greater proportion of users may be presented with a particular composition associated with a greater level of interactivity). Thus, according to the multi-armed bandit procedure, the informational content and/or the textual/image content that is to be presented to the user may be based on a real-time (e.g., at a time the user interface information is transmitted) level of interactivity associated with the informational content and/or the textual/image content.

Figure 1E:
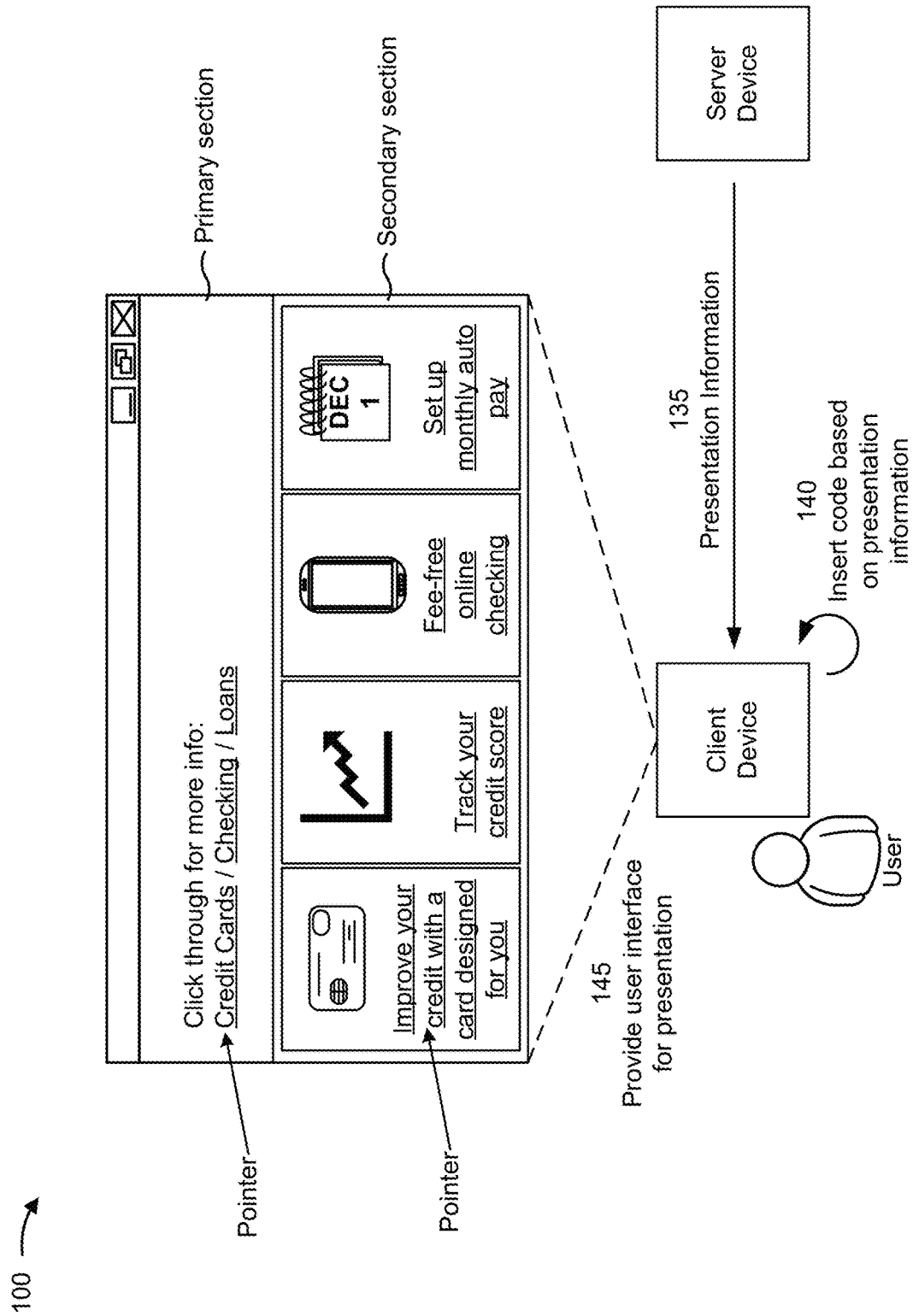

As shown in FIG. 1E and by reference number 135, the server device may transmit second presentation information to the client device. The presentation information may identify the informational content (e.g., the plurality of informational content blocks) determined by the server device. Accordingly, the informational content may be based on the particular combination of the objective and the outcome and/or the user information. Moreover, the presentation information may identify the order of relevance determined by the server device for the informational content (e.g., the plurality of informational content blocks).

In some implementations, the client device may obtain the second presentation information from the first presentation information (e.g., the client device does not transmit the user interface information to the server device, and the server device does not transmit the second presentation information to the client device). For example, the client device may obtain the second presentation information from the primary section of the document object (e.g., the second presentation information may be embedded, such as in hidden code, in the primary section). As an example, the server device may determine the informational content (e.g., the plurality of informational content blocks) for the second presentation information based on the user information or other information and transmit the second presentation information with the first presentation information. In some implementations, the server device may determine respective sets of informational content (e.g., which are customized based on the user information) for a plurality of possible combinations of an objective and an outcome, and the second presentation information may identify the respective sets of informational content. The client device may obtain (e.g., from the first presentation information, such as from the primary section) a particular set of informational content (e.g., the second presentation information) that is responsive to the combination of the objective and the outcome input by the user.

As shown by reference number 140, the client device may insert code based on the second presentation information into the document object. For example, the client device may insert the code into the DOM associated with the document object. The code may cause the secondary section of the document object to change from the initial content to updated content (e.g., second document content). The updated content may include the informational content (e.g., the plurality of informational content blocks) of the second presentation information. In some implementations, the content of the primary section does not change when the code causes the secondary section to change content. In other words, the primary section may include static content and the secondary section may include dynamic content.

In some implementations, before inserting code based on the second presentation information, the client device may insert different code into the document object. The different code may cause the secondary section of the document object to change from the initial content to an indication that the updated content is loading (e.g., the indication may be a loading spinner or a progress bar). The client device may obtain the second presentation information (e.g., from the first presentation information, as described above) after a threshold waiting period (e.g., two seconds), and the client device may insert the code based on the second presentation information into the document object, as described above. Here, the code may cause the secondary section to change from the loading indication to the updated content. This may be useful when the second presentation information is obtained by the client device from the first presentation information and is not received from the server device. For example, the loading indication may provide an impression that the informational content for the secondary section, which was determined ahead of time, is being determined in real time.

As described above, the informational content of the secondary section may include a direct pointer to a resource, and the primary section may include a pointer to the same resource. The pointer of the primary section may be a direct pointer or an indirect pointer to the resource (e.g., the indirect pointer leads to an intermediate resource that includes a direct pointer to the resource). For example, the informational content may include information relating to a no-fee checking account and include a direct pointer to a resource (e.g., a webpage) relating to the no-fee checking account. Continuing with the example, the primary section may include a direct pointer (shown as "Checking") to an intermediate resource relating to various checking account types offered by the entity, and the intermediate resource may include a direct pointer to the resource relating to the no-fee checking account. Thus, information that is accessible from a homepage through several navigation steps can be presented to the user on the homepage without the user navigating away from the homepage, thereby providing an improved user experience and conserving computing resources.

As shown by reference number 145, the client device may provide the user interface for presentation by the client device based on inserting the code into the document object. For example, the client device may provide the content of the document object, modified by the second presentation information, in the user interface. In some implementations, the initial content may be included in a first document object (e.g., a first webpage) and the updated content may be included in a second document object (e.g., a second webpage). In other words, the client device may provide, in the user interface, a first document object (e.g., received from the server device) that includes the initial content, obtain the user input via inputs of the first document object, transmit the user interface information identifying the user input to the server device, and provide, in the user interface, a second document object (e.g., received from the server device) that includes the updated content.

As indicated above, FIGS. 1A-1E are provided as an example. Other examples may differ from what is described with regard to FIGS. 1A-1E.

Figure 2:
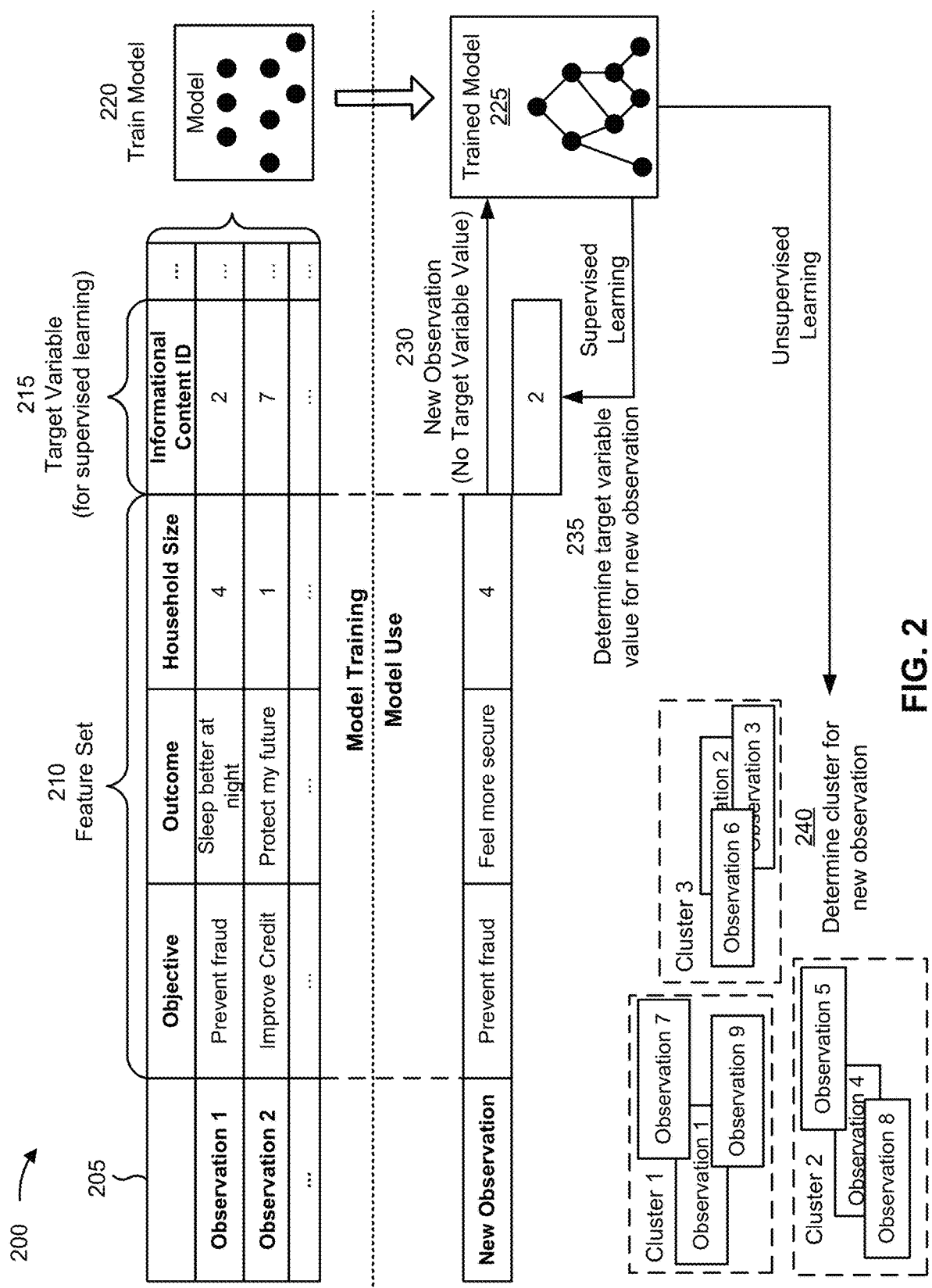
FIG. 2 is a diagram illustrating an example of training and using a machine learning model in connection with informational content identification.

FIG. 2 is a diagram illustrating an example 200 of training and using a machine learning model in connection with informational content block identification. The machine learning model training and usage described herein may be performed using a machine learning system. The machine learning system may include or may be included in a computing device, a server, a cloud computing environment, or the like, such as a client device and/or a server device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a client device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a client device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of an objective, a second feature of an outcome, a third feature of household size, and so on. As shown, for a first observation, the first feature may have a value of "prevent fraud," the second feature may have a value of "sleep better at night," the third feature may have a value of 4, and so on. These features and feature values are provided as examples and may differ in other examples. For example, the feature set may include one or more of the following features: an objective of a user, an outcome desired by a user, demographic information for a user (e.g., a household size of a user, a marital status of the user, and/or an education level of a user), a location of a user, a browsing history of a user, account information of a user (e.g., an account balance of a user, subscribed services for a user, and/or products used by a user), and/or an indication of interactivity (e.g., whether a user visited a pointer, used a tool, and/or registered for a product and/or a service) with informational content, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is informational content (e.g., one or more informational content blocks), which is identified by a value of 2 for the first observation (e.g., corresponding to informational content identified by an identifier of "2"). Additionally, or alternatively, the target variable may be textual content, image content, and/or a default selection for an input, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of an objective, a second feature of an outcome, a third feature of household size, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 2 for the target variable of an informational content identifier for the new observation, as shown by reference number 235. Based on this prediction, the machine learning system may provide output for display, may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., users with large households interested in fraud prevention), then the machine learning system may provide output for display and/or provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., users seeking stress reduction), then the machine learning system may provide a second (e.g., different) output and/or recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to informational content identification. The machine learning system enables recognition and/or identification of tens, hundreds, thousands, or millions of features and/or feature values for tens, hundreds, thousands, or millions of observations, thereby increasing accuracy and consistency and reducing delay associated with informational content identification relative to requiring computing resources to be allocated for tens, hundreds, or thousands of operators to manually identify informational content using the features or feature values.

As indicated above, FIG. 2 is provided as an example. Other examples may differ from what is described in connection with FIG. 2.

Figure 3:
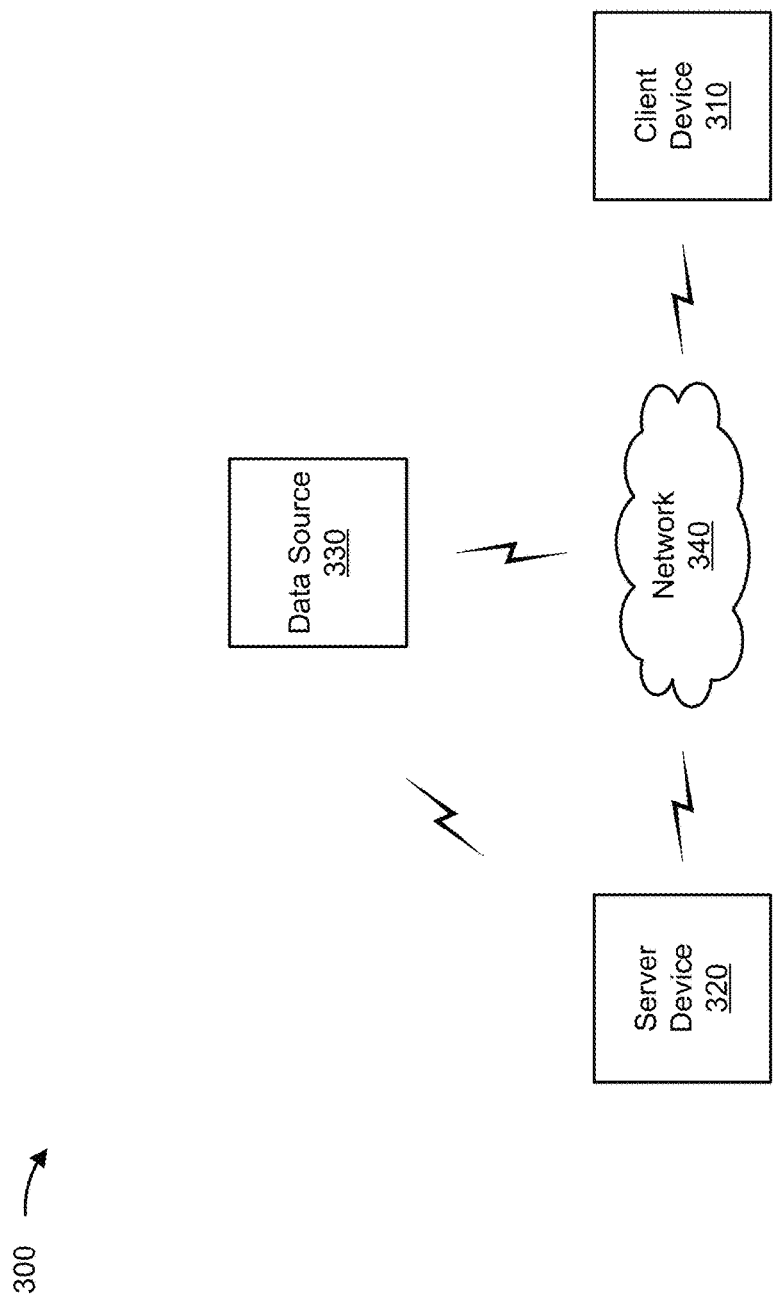
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client device 310, a server device 320, a data source 330, and a network 340. Devices of environment 300 may interconnect via wired connections, wireless connections, or a combination of wired and wireless connections.

The client device 310 includes one or more devices capable of receiving, generating, storing, processing, and/or providing information associated with modifying a document content section of a document object of a GUI, as described elsewhere herein. The client device 310 may include a communication device and/or a computing device. For example, the client device 310 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 320 includes one or more devices capable of receiving, generating, storing, processing, providing, and/or routing information associated with modifying a document content section of a document object of a GUI of a client device, as described elsewhere herein. The server device 320 may include a communication device and/or a computing device. For example, the server device 320 may include a server, such as an application server, a client server, a web server, a database server, a host server, a proxy server, a virtual server (e.g., executing on computing hardware), or a server in a cloud computing system. In some implementations, the server device 320 includes computing hardware used in a cloud computing environment.

The data source 330 includes one or more devices capable of receiving, generating, storing, processing, and/or providing information associated with user information, as described elsewhere herein. The data source 330 may include a communication device and/or a computing device. For example, the data source 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 330 may communicate with one or more other devices of environment 300, as described elsewhere herein.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The quantity and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
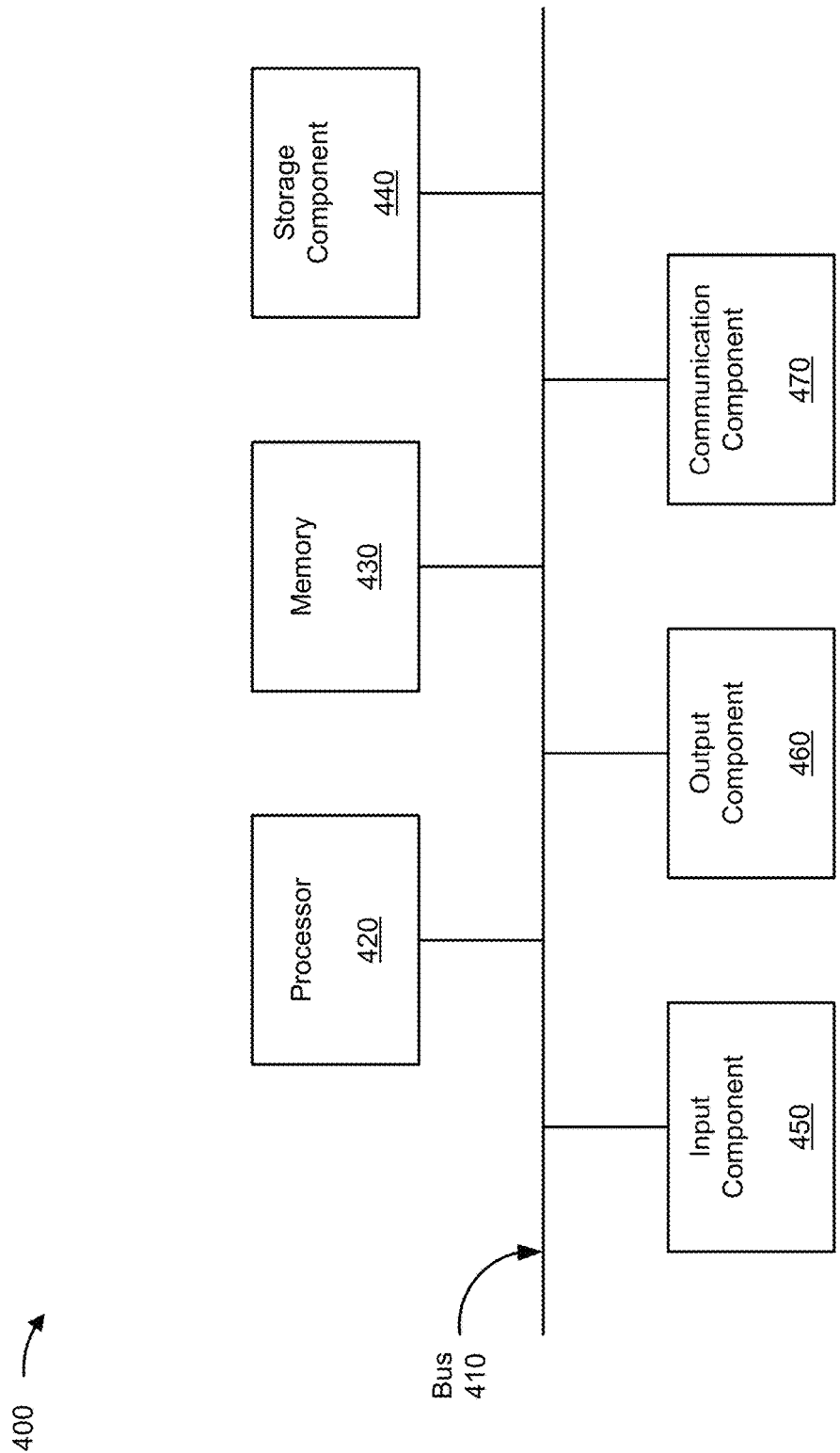
FIG. 4 is a diagram of example components of one or more devices of FIG. 3.

FIG. 4 is a diagram of example components of a device 400, which may correspond to client device 310, server device 320, and/or data source 330. In some implementations, client device 310, server device 320, and/or data source 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with modifying a document content section of a document object of a GUI. In some implementations, one or more process blocks of FIG. 5 may be performed by a client device (e.g., client device 310). In some implementations, one or more process blocks of FIG. 5 may be performed by another device or a group of devices separate from or including the client device, such as a server device (e.g., server device 320) or a data source (e.g., data source 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include providing, in a document object of a user interface, a primary document content section, and a secondary document content section that includes first document content, for presentation, where the first document content includes at least a first input for selection of an objective from a plurality of objectives and a second input for selection of an outcome for the objective from a plurality of outcomes (block 510). As further shown in FIG. 5, process 500 may include receiving, via the first input and the second input, user input of a particular combination of the objective and the outcome (block 520). As further shown in FIG. 5, process 500 may include obtaining presentation information that identifies a plurality of informational content blocks responsive to the particular combination, where an informational content block, of the plurality of informational content blocks, includes a direct pointer to a resource, and the primary document content section includes a direct or indirect pointer to the resource (block 530). As further shown in FIG. 5, process 500 may include inserting code based on the presentation information into the document object, where the code causes the secondary document content section to change content from the first document content to second document content for presentation via the user interface, where the second document content includes the plurality of informational content blocks (block 540). As further shown in FIG. 5, process 500 may include providing the user interface for presentation based on inserting the code into the document object (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
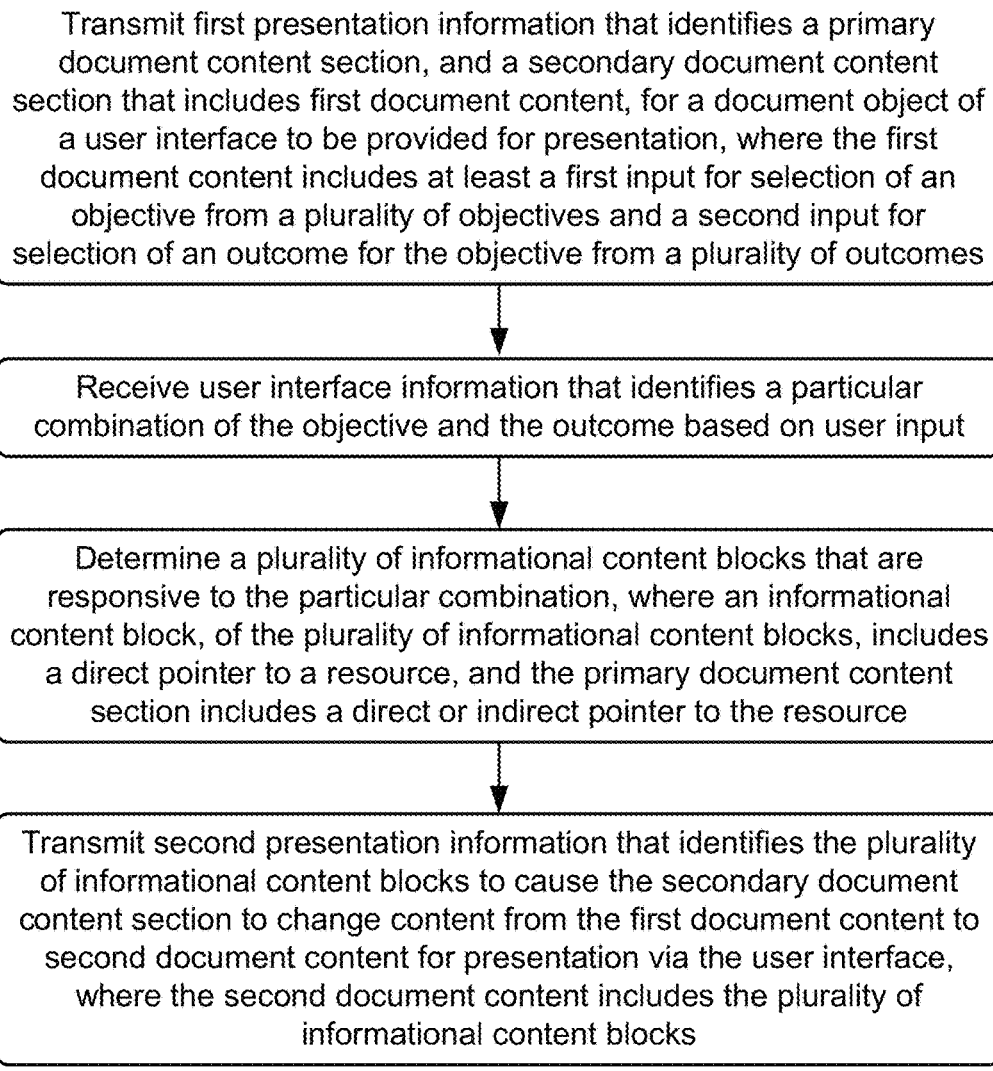

FIG. 6 is a flowchart of an example process 600 associated with modifying a document content section of a document object of a GUI. In some implementations, one or more process blocks of FIG. 6 may be performed by a server device (e.g., server device 320). In some implementations, one or more process blocks of FIG. 6 may be performed by another device or a group of devices separate from or including the server device, such as a client device (e.g., client device 310) or a data source (e.g., data source 330). Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include transmitting first presentation information that identifies a primary document content section, and a secondary document content section that includes first document content, for a document object of a user interface to be provided for presentation, where the first document content includes at least a first input for selection of an objective from a plurality of objectives and a second input for selection of an outcome for the objective from a plurality of outcomes (block 610). As further shown in FIG. 6, process 600 may include receiving user interface information that identifies a particular combination of the objective and the outcome based on user input (block 620). As further shown in FIG. 6, process 600 may include determining a plurality of informational content blocks that are responsive to the particular combination, where an informational content block, of the plurality of informational content blocks, includes a direct pointer to a resource, and the primary document content section includes a direct or indirect pointer to the resource (block 630). As further shown in FIG. 6, process 600 may include transmitting second presentation information that identifies the plurality of informational content blocks to cause the secondary document content section to change content from the first document content to second document content for presentation via the user interface, where the second document content includes the plurality of informational content blocks (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for modifying a document object of a user interface to be provided for presentation by a client device, the set of instructions comprising:

one or more instructions that, when executed by one or more processors of the client device, cause the client device to:
provide, in the document object of the user interface, a primary document content section, and a secondary document content section that includes first document content, for presentation by the client device,
wherein the first document content includes at least a first input for selection of an objective from a plurality of objectives and a second input for selection of an outcome for the objective from a plurality of outcomes;
select, using a machine learning model and based on user information obtained from a data source, a first default selection associated with the first input and a second default selection associated with the second input;
provide information associated with the first default selection and information associated with the second default selection to the client device;
receive, via the first input and the second input, user input of a particular combination of the objective and the outcome;
determine presentation information that identifies a plurality of informational content blocks responsive to the particular combination,
wherein the plurality of informational content blocks are identified based on a determination that an informational content block, of the plurality of informational content blocks, is associated with a threshold level of interactivity among a plurality of users that selected the particular combination;
insert, after the determining, based on receiving the user input, a first code into the document object,
wherein the first code causes the secondary document content section to change to an indication that updated content is loading;
insert a second code, based on a threshold waiting period expiring, into the document object,
wherein the second code is determined based on the presentation information;
wherein the second code causes the secondary document content section to change content from the first document content to second document content for presentation via the user interface by the client device,
wherein the second document content includes the plurality of informational content blocks; and
provide the user interface for presentation by the client device based on inserting the second code into the document object.

2. The non-transitory computer-readable medium of claim 1, wherein the plurality of informational content blocks are in an order of relevance to the particular combination.

3. The non-transitory computer-readable medium of claim 1, wherein a first content of the primary document content section does not change when the second code causes a second content of the secondary document content section to change from the first document content to the second document content.

4. The non-transitory computer-readable medium of claim 1, wherein the plurality of informational content blocks include at least a first informational content block that includes information relating to advice, a second informational content block that includes information relating to a service that is offered, a third informational content block that includes information relating to a tool usable via the user interface, and a fourth informational content block that includes information relating to a product that is offered.

5. The non-transitory computer-readable medium of claim 1, wherein the plurality of informational content blocks are based on at least one of the objective or the outcome of the particular combination.

6. The non-transitory computer-readable medium of claim 1, wherein the one or more instructions, that cause the client device to obtain the presentation information, cause the client device to:
   transmit, to a server device, user interface information that identifies the particular combination; and
   receive, from the server device, the presentation information.

7. The non-transitory computer-readable medium of claim 1, wherein the machine learning model is trained with one or more clusters of observation data.

8. A method of modifying a document object of a user interface to be provided for presentation by a client device, comprising:
   providing, in the document object of the user interface, a primary document content section, and a secondary document content section that includes first document content, for presentation by the client device,
      wherein the first document content includes at least a first input for selection of an objective from a plurality of objectives and a second input for selection of an outcome for the objective from a plurality of outcomes;
   selecting, using a machine learning model and based on user information obtained from a data source, a first default selection associated with the first input and a second default selection associated with the second input;
   providing information associated with the first default selection and information associated with the second default selection to the client device;
   receiving, via the first input and the second input, user input of a particular combination of the objective and the outcome;
   determining presentation information that identifies informational content responsive to the particular combination,
      wherein the informational content is identified based on a determination that the informational content is associated with a threshold level of interactivity among a plurality of users that selected the particular combination;
   insert, after the determining, a first code into the document object,
      wherein the first code causes the secondary document content section to change to an indication that updated content is loading;
   determining a second code based on the presentation information;
   inserting the second code, based on a threshold waiting period expiring, into the document object,
      wherein the second code causes the secondary document content section to change content from the first document content to second document content for presentation via the user interface by the client device,
         wherein the second document content includes the informational content; and
   providing the user interface for presentation by the client device based on inserting the second code into the document object.

9. The method of claim 8, wherein a first content of the primary document content section does not change when the second code causes a second content of the secondary document content section to change from the first document content to the second document content.

10. The method of claim 8, wherein the presentation information is obtained from the primary document content section.

11. The method of claim 8, wherein obtaining the presentation information comprises:
   transmitting, to a server device, user interface information that identifies the particular combination; and
   receiving, from the server device, the presentation information.

12. The method of claim 8, wherein the informational content is based on at least one of the objective or the outcome of the particular combination.

13. The method of claim 8, wherein the informational content includes at least one of image content or textual content, and
   wherein the at least one of the image content or the textual content is based on at least one of demographic information associated with a user of the client device or a location of the client device.

14. The method of claim 8, wherein the first input is assigned a first default selection for the objective and the second input is assigned a second default selection for the outcome, and
   wherein the first default selection and the second default selection are based on at least one of demographic information associated with a user of the client device, account information associated with the user, a location of the client device, or a browsing history of the client device.

15. The method of claim 8, wherein the second document content is adjusted in real-time based on a respective level of interactivity associated with the informational content.

16. A system for modifying a document object of a user interface to be provided for presentation by a client device, the system comprising:
   one or more memories; and
   one or more processors, communicatively coupled to the one or more memories, configured to:
      transmit, to the client device, first presentation information that identifies a primary document content section, and a secondary document content section that includes first document content, for the document object of the user interface to be provided for presentation by the client device,
         wherein the first document content includes at least a first input for selection of an objective from a plurality of objectives and a second input for selection of an outcome for the objective from a plurality of outcomes;
      select, using a machine learning model and based on user information obtained from a data source, a first default selection associated with the first input and a second default selection associated with the second input;
      provide information associated with the first default selection and information associated with the second default selection to the client device;
      receive, from the client device, information that identifies a particular combination of the objective and the outcome based on user input provided to the client device;

determine a plurality of informational content blocks that are responsive to the particular combination,
  wherein the plurality of informational content blocks are identified based on a determination that an information content block, of the plurality of informational content blocks, is associated with a threshold level of interactivity among a plurality of users that selected the particular combination; and
insert, after the determining the plurality of informational content blocks, a first code into a document object associated with the user interface,
  wherein the first code causes the secondary document content section to change to an indication that updated content is loading;
determine a second code based on the plurality of informational content blocks; and
transmit, to the client device, second presentation information that identifies the plurality of informational content blocks to cause the second code to be inserted into the document object based on a threshold waiting period expiring, and causes the secondary document content section to change content from the first document content to second document content for presentation via the user interface by the client device,
  wherein the second document content includes the plurality of informational content blocks.

17. The system of claim 16, wherein the one or more processors, when determining the plurality of informational content blocks, are configured to:
determine, for the plurality of informational content blocks, an order of relevance to the particular combination,
  wherein the second presentation information identifies the plurality of informational content blocks in the order of relevance to the particular combination.

18. The system of claim 16, wherein the one or more processors, when determining the plurality of informational content blocks, are configured to:
determine at least one of an image content or a textual content for at least one informational content block, of the plurality of informational content blocks, based on at least one of demographic information associated with a user of the client device or a location of the client device.

19. The system of claim 16, wherein the plurality of informational content blocks are determined based on the particular combination and at least one of demographic information associated with a user of the client device, account information associated with the user, a location of the client device, or a browsing history of the client device.

20. The system of claim 16, wherein the one or more processors, when determining the plurality of informational content blocks, are configured to:
determine that a particular resource has been previously accessed by the client device; and
determine whether a particular informational content block, that is to include a pointer to the particular resource, is to be included in the plurality of informational content blocks based on determining that the particular resource has been previously accessed by the client device.

* * * * *